United States Patent [19]

Shook

[11] 3,909,342

[45] Sept. 30, 1975

[54] MACHINE FOR MAKING CONTOUR-CORE BLANKETS

[75] Inventor: Gerald D. Shook, Huntington Station, N.Y.

[73] Assignee: Baltek Corporation, Northvale, N.J.

[22] Filed: June 14, 1973

[21] Appl. No.: 369,843

[52] U.S. Cl. .......................... 156/522; 9/6; 52/384; 83/11; 83/408; 156/248; 156/257; 156/268; 156/563; 156/570

[51] Int. Cl.² ........ B32B 31/10; B32B 31/18; B63B 3/00

[58] Field of Search .......... 156/248, 250, 257, 259, 156/264, 265, 268, 279, 300, 363, 519, 523, 526, 533, 534, 535, 541, 542, 552, 563, 566–572; 161/36, 37, 39, 68, 93, 147; 83/10, 11, 408; 52/384–388, 389, 399, 631, 746; 9/6

[56] References Cited
UNITED STATES PATENTS

| | | | |
|---|---|---|---|
| 2,905,579 | 9/1959 | Sumner | 156/257 |
| 3,139,371 | 6/1964 | Sisko | 156/279 |
| 3,393,109 | 7/1968 | Dorst | 161/39 |
| 3,540,967 | 11/1970 | Shook et al. | 161/37 |
| 3,557,840 | 1/1971 | Maybee | 52/631 |
| 3,591,443 | 7/1971 | Cox | 9/6 |
| 3,616,112 | 10/1971 | Desai | 156/300 |
| 3,626,795 | 12/1971 | White | 83/11 |

*Primary Examiner*—Charles E. Van Horn
*Assistant Examiner*—John E. Kittle

[57] ABSTRACT

A machine for making a tessellated contour-core blanket that is conformable to a contoured surface such as the hull of a vessel, for lamination thereto. In the machine, the underside of a web of scrim material is coated with adhesive, the coated web then being pressed against and bonded to the face of a balsa panel. The scrim-faced panel is turned over, and the resultant scrim-based panel is fed through a first slitter station which sections the panel longitudinally into parallel strips. The longitudinally-slitted, scrim-based panel is then fed into a second slitter station which slits the strips transversely into blocks. The slitters at both stations are set to fall slightly short of the scrim and to leave a superficial skin of panel material which serves to maintain the blocks in close proximity to each other and to avoid gaps therebetween.

7 Claims, 10 Drawing Figures

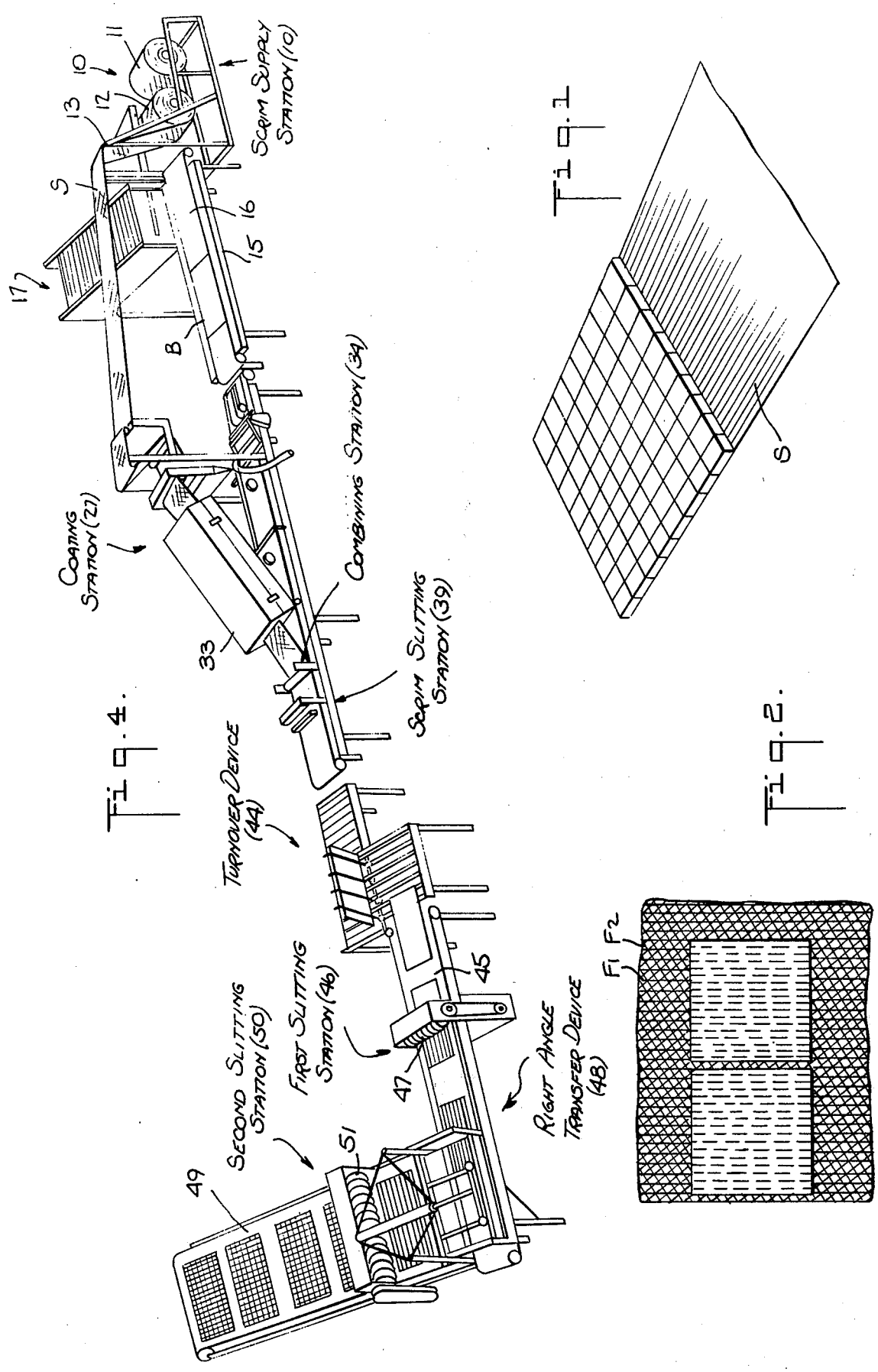

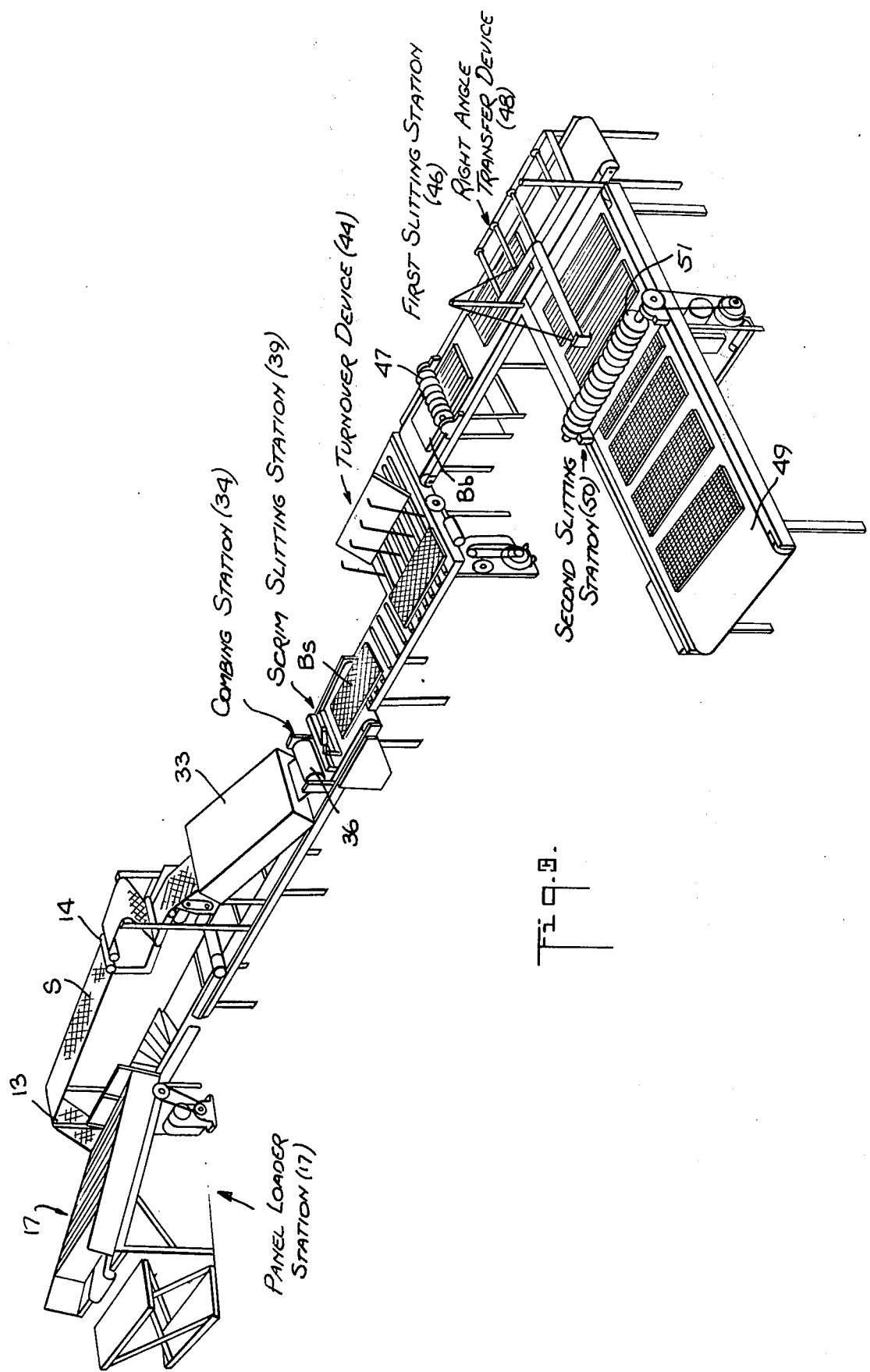

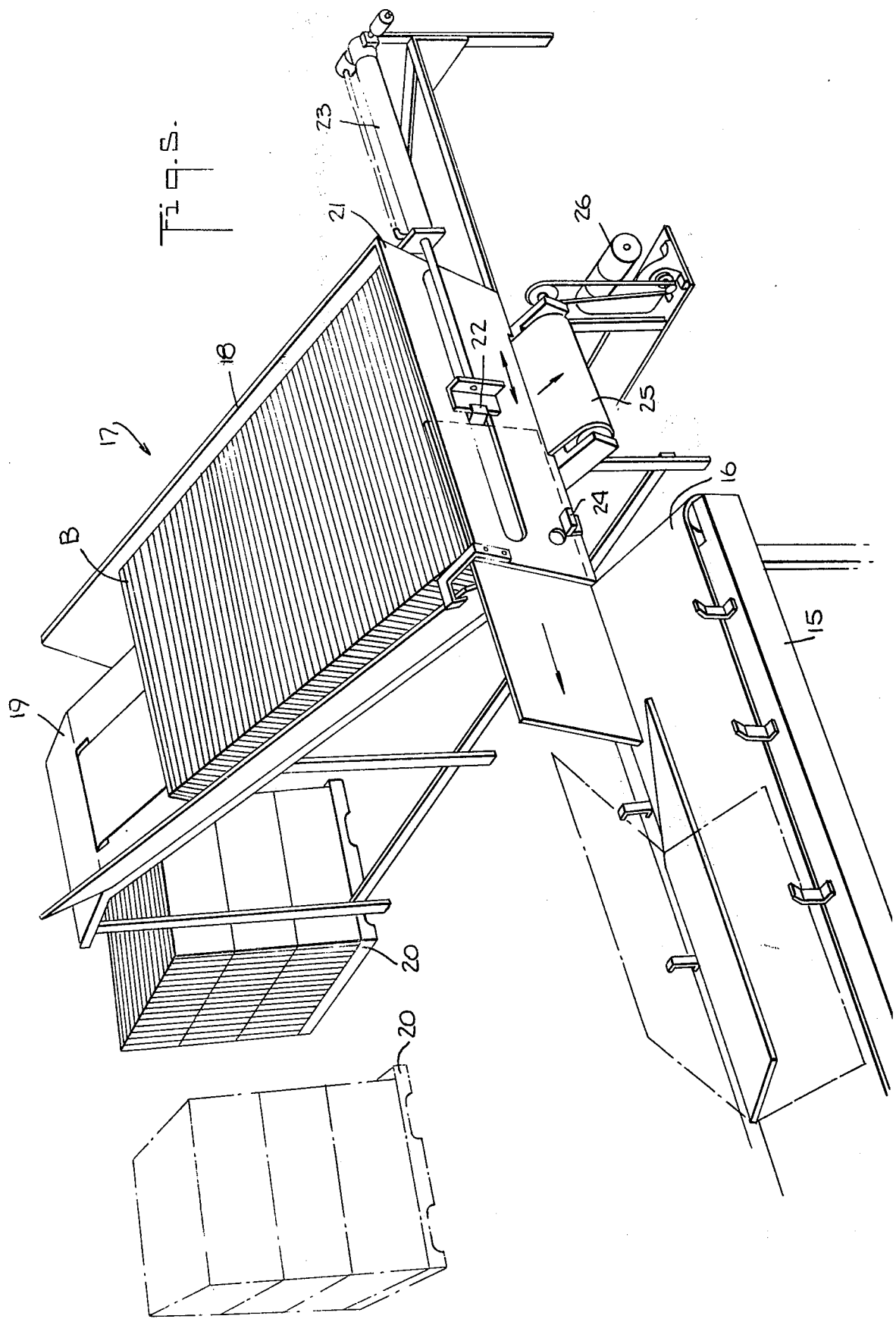

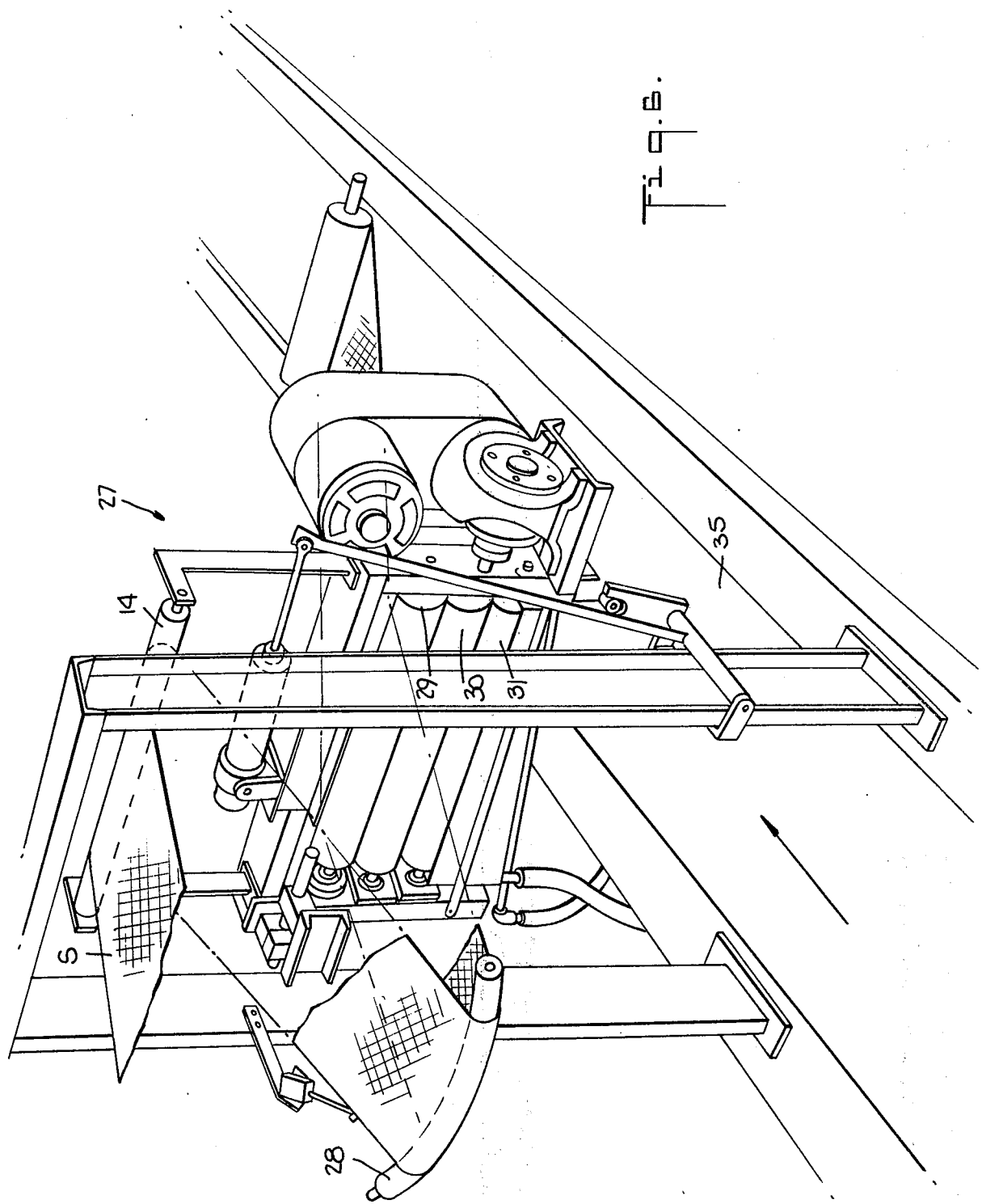

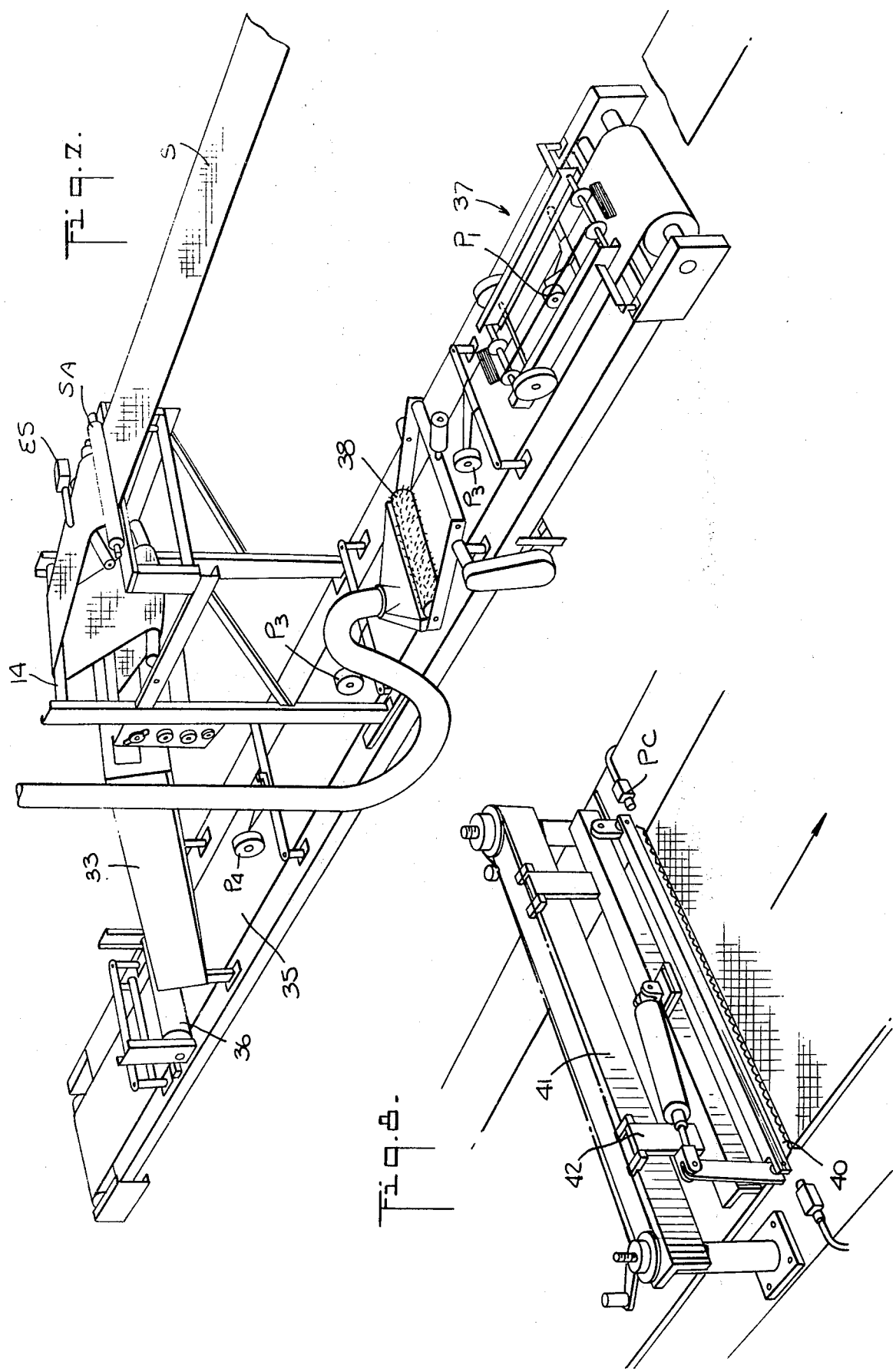

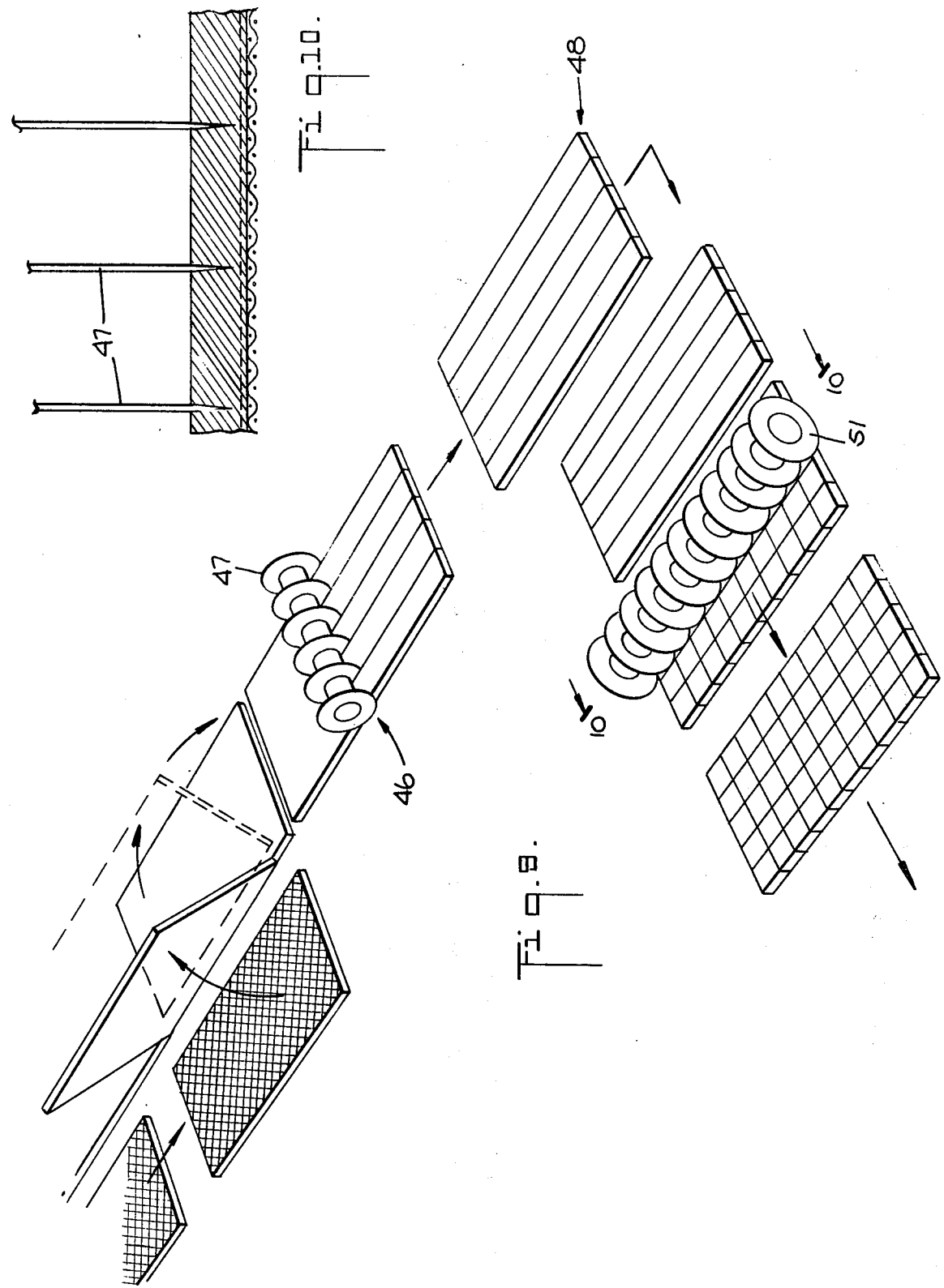

MACHINE FOR MAKING CONTOUR-CORE BLANKETS

BACKGROUND OF THE INVENTION

This invention relates generally to light-weight, high-strength cores for laminated structures, and more particularly to a machine for automatically producing a tessellated core blanket formed of balsa blocks attached to a flexible carrier, the blanket being conformable to a contoured surface.

It is known that laminates of high-strength-to-weight ratio can be realized by combining the superior properties of end-grain balsa cores with facing material such as reinforced fiberglass. End-grain balsa wood of good quality has a uniformly high compressive strength as well as a high modulus of rigidity and elasticity.

Where the structure to be reinforced is constituted by planar surfaces, the balsa core is simply a solid slab of material laminated to the facings. But in the case of hulls and other structures having double curvatures or other complex contours, it is ordinarily not possible to conform the solid balsa to the contour without bending the balsa slab, and this involves difficult, time-consuming and expensive techniques.

In recent years, balsa blankets have been developed composed of balsa blocks attached to a common carrier, such as a fabric scrim, whereby the blanket may readily be conformed to a curved surface for lamination thereto. Such blankets are useful in the construction of reinforced plastic boats and larger vessels, for they lend themselves to lamination between plies of reinforced fiberglass or other plastic material, thereby bringing about a distribution of weight favorable to high stability and buoyancy, as well as imparting stiffness to the structure. Such tessellated blankets are also useful in creating thermal jackets surrounding cryogenic containers, for balsa not only possesses remarkable structural properties, but it also has excellent thermal insulation characteristics.

In the Shook-Levine U.S. Pat. No. 3,376,185, there is disclosed a machine for making such balsa-blankets, the machine including a conveyor belt operating in conjunction with a series of stations. In this machine, a web of scrim material is first fed through a coating station in which an adhesive is applied to one side thereof, the coated web then entering a combining station where it is adhesively joined to an array of individual balsa blocks conveyed thereto from a strip-slitting station, thereby producing a core blanket in which each block is adhered to the common scrim.

Since the scrim is adhered to individual blocks, it is necessary, starting with balsa sheets or panels as the basic stock, to pre-cut these panels into strips whose width corresponds to the width of the blocks to be formed. Then in the machine of the type disclosed in the Shook-Levine patent, these strips are fed to a slitter where each strip is sectioned into individual blocks before the scrim is combined therewith.

Because in blankets made by this machine, the blocks are separate from each other, the separation between blocks tends to be somewhat irregular and gaps of various sizes are developed therebetween. The resultant air spaces, in cryogenic applications, constitute leakage paths or thermal blankets and degrade the quality of insulation. Also, when laminating the blanket to facing skins to form sandwich panels, the resin used for such lamination tends to seep into the gaps. It becomes necessary, therefore, to use a relatively large amount of costly resin to effect lamination. Much of this resin is absorbed in the gaps and performs no useful bonding function, but only contributes excess weight to the core.

Moreover, with very thin facings such as those formed of one or two layers of chopped fiberglass matting of the type used in panels for deck areas, this absorption of the laminating resin in the blocks of the blanket may cause resin starvation in certain areas and produce printout or so-called "telegraphy" effects, whereby the edges of the blocks become visible through the skin to create a checkerboard pattern. This effect is highly objectionable from the design standpoint.

SUMMARY OF THE INVENTION

In view of the foregoing, it is the main object of this invention to provide a high-speed, automatic machine, adopted to produce a tessellated balsa-core blanket of high quality, efficiently and economically.

The balsa-core blanket produced by a machine in accordance with the invention is superior to blankets of the type heretofore available, for the blocks of balsa attached to the scrim are in close proximity to each other, thereby avoiding gapping and the drawbacks incident thereto.

A salient feature of a machine in accordance with the invention is that balsa is fed thereto in panel form, the panel being adhered to a scrim and being sectioned into blocks which are joined together by a superficial skin of panel material that functions to maintain the blocks in close proximity to each other without interfering with their normal block function.

Another significant advantage of the invention is that the superficial skin which holds the blocks together serves to prevent the blocks from dislodging during unpacking of the blanket and handling thereof, whereas when the tessellated blanket is placed in a double-contoured mold or against any other complex surface to which the blanket is to be laminated, individual blocks are readily dislodged from the scrim, when necessary, in order to conform tightly to the contour.

Briefly stated, these objects are accomplished by a machine in which a web of scrim material drawn from a roll at a supply station is fed through a coating station wherein adhesive in solution form is applied to the underside thereof. The coated scrim, after being heated to render the adhesive tacky, is conducted through a combining station to which is fed a continuous train of balsa panels supplied by a loading station.

At the combining station, the scrim web is pressed against and bonded to the face of the panels, after which, at a scrim-slitting station, the scrim is transversely cut in the space between successive panels in the train, to provide scrim-faced panels. These are turned over before being fed as scrim-based panels into a first slitting station. At the first slitting station, the panel is sectioned longitudinally into parallel strips, the longitudinally-slit, scrim-based panel then being transferred to a second slitting station where it is transversely slit into blocks.

The slitters at both stations are set to fall slightly short of the scrim and to leave a superficial skin of panel material which serves to maintain the blocks in close proximity to each other and to avoid gaps therebetween. Because the scrim is adhered to the panel before slitting takes place, and the slitting action does not fully separate the blocks from each other, the blocks form a uniform array.

OUTLINE OF THE DRAWINGS

For a better understanding of the invention, as well as other objects and further features thereof, reference is made to the following detailed description to be read in conjunction with the accompanying drawings, wherein:

FIG. 1 is a perspective view of a tessellated core blanket in accordance with the invention;

FIG. 2 is a plan view of the blanket with most of the blocks removed to expose the scrim;

FIG. 3 is a perspective view of an automatic machine for making a tessellated core blanket in accordance with the invention, the machine being shown as viewed at the output end, looking toward the input end;

FIG. 4 is a perspective view of the same machine as seen along the length thereof;

FIG. 5 is a perspective view of the loading station of the machine;

FIG. 6 is a perspective view of the coating station of the machine;

FIG. 7 shows the scrim alignment device and panel spacer unit preceding the coating and combining station;

FIG. 8 is a separate view of the scrim cutting station;

FIG. 9 is a perspective view of the turn-over device, and the first and second slitting stations; and FIG. 10 is a transverse section taken in the plane indicated by line 10—10 in FIG. 9.

DESCRIPTION OF THE INVENTION

An automatic machine according to the invention is adapted to produce at a high production rate, a contour-core blanket formed as shown in FIGS. 1 and 2 of balsa block adhered to a common carrier or scrim. Fed into the machine are a train of standardized panels of balsa core and a continuous web of scrim material, the web being adhered to the advancing panels and being cut between panels to provide scrim-faced panels which are thereafter turned-over and slit to section the panels into blocks without severing the scrim base, thereby creating a contour core balsa blanket.

More specifically, the machine shown in FIGS. 3 and 4 is composed of a group of coordinated supply and operating stations. A web of scrim material is continuously supplied to a coater station which applies an adhesive coating in solution form to the undersurface of the web, the coated web then being heated to render it tacky before it is pressed down and bonded in a combining station to the planar surface of the balsa panels successively conveyed to this station from a loader station. After leaving the combining station, the scrim web is transversely cut in the space between successive panels to produce a scrim-faced panel which is then turned over to place the scrim below the panel as a base therefor.

The scrim-based panels are then conveyed through a first slitter station which sections the panels, but not the base scrim, into parallel strips. The longitudinally slit, scrim-based panels are then conveyed through a second slitting station which cuts the parallel strips into blocks, again without touching the scrim base.

The first and second slitting operations are set to fall slightly short of the scrim, so that the blocks are not fully separated, but are held together at their underside in contiguous relation to minimize gapping therebetween without, however, interfering with the ability of the contourable core blanket to conform to a substrate for lamination thereto.

Referring now to FIGS. 3 and 4, it will be seen that a web of scrim material S is drawn from a scrim supply station, generally designated by numeral 10. Scrim S, as shown separately in FIG. 2, preferably takes the form of a flexible, non-woven, open-mesh material of high strength, fabricated of fiberglass or other non-stretchable yarns of high tensile strength, having longitudinally extending warp threads W and two intersecting sets of fill threads $F_1$ and $F_2$, each displaced 60° from the axis of the warp threads, whereby the fill threads are 120° apart.

Thus the scrim is a dimensionally stable, quasi-isotropic material having three axes of high strength. Because of the open mesh, the surfaces of the blocks adhered thereto are almost fully exposed to facilitate lamination. On the other hand, the stability of the scrim and the superficial skin on the panel maintains the blocks at their assigned positions and prevents overlapping thereof in handling. Fiberglass has the characteristics of wettability, as opposed, for example, to nylon yarn, which resists wetting. Consequently, the fiberglass scrim may effectively be bonded by standard resins and other adhesive agents, both to the blocks and to the laminating plies.

Alternatively the scrim may be in the so-called plain weave form with a warp/fill construction 20 × 10 threads per inch, composed of warp yarns, 150's — 1/0 and fill yarns, 75's — 1/0 with a compatible finish on the glass strands. The weave have two axes of high strength.

It is to be understood, however, that the invention is not limited to the use of scrims of the above-described type, and that any other acceptable forms of scrim material may be employed to form a contour-core blanket.

At the scrim supply station 10, two rolls 11 and 12 of scrim are supported on elevated axles coupled to an electrically controlled friction drag of the type commonly used in web operations and serving to maintain the scrim web under slight tension to effect uniform application of adhesive at the coating station. One scrim roll serves as a reserve so that upon nearing depletion of the roll being unwound, the scrim from the other roll is attached to the operating web and the depleted roll is then replaced.

Scrim web S is conducted by elevated rollers 13 and 14 over a table 15 having a conveyor belt 16 onto which panels B of balsa wood are successively dispensed by a panel loader station, generally designated by numeral 17. As shown in FIG. 7 an automatic scrim alignment device SA is provided which may be of commercial design, the device acting in conjunction with an edge sensor unit ES and movable rolls to prevent virtually any lateral motion of the scrim through the coating and combining stations. This arrangement ensures that despite unevenness in the scrim supply, the scrim will automatically align with the panels at the squeeze roller.

As shown separately in FIG. 5, loader station 17 includes a gravity-feed slide 18 having an input platform 19 onto which a stack of balsa panels B is transferred from a skid 20.

The panels, which in practice may be 2 by 4 feet in size, with a controlled thickness, are kiln-dried, the grain thereof being normal to the width and length. To provide a firm area for contact to the adhesive and good shear surfaces within the sandwich, the balsa panels are sawed and sanded at the mill to close tolerances. It will be appreciated that the dimensions given above are purely illustrative, and that the panels can be made in any desired size as long as it conforms to the width of the scrim for which the machine width is designed.

At the foot of slide 18, the lowermost panel B which lies against the footboard 21, is ejected laterally from a side opening in the slide, by means of a reciprocating side pusher 22 operated by a hydraulic cylinder 23. The pusher engages the end of panel B, and in its forward stroke, pushes the engaged panel out of the slide onto conveyor 16, the pusher then being retracted.

A sensor 24, which engages the pushed panel, produces a control signal when it senses that the panel is outside the slide, the signal causing the motor 26 to drive a continuous belt 25 to advance the next panel to touch back stop 21 in preparation for the next pushing cycle belt 25, driven intermittently by motor 26, travels below the panels on the slide to advance the panels toward the ejection position.

The web S of scrim material, which travels well above the advancing panels on conveyor table 15, is conducted through the scrim alignment device SA into a coating station, generally designated by numeral 27. This station, as shown separately in FIG. 6, includes overhead roller 14, which reverses the direction of web travel, the web then going in a downwardly-inclined path toward a spreader roller 28 which has an arcuate configuration designed to remove wrinkles from the scrim. Such rollers are known commercially as "Mount Hope" rollers. From there the scrim travels over a coating roll 29 which is supplied with adhesive in solution form from a printing roll 30.

Printing roll 30 is preferably formed with a series of circumferential grooves and runs in engagement with a transfer roll 31 which rotates in an adhesive bath contained in a trough 32. Thus the adhesive solution for coating the entire surface of transfer roll 31 is received within the grooves of printing roll 30, thereby distributing the adhesive material on coating roll 29 which engages the undersurface of scrim S to produce a uniform coating of adhesive on every fiber of the scrim.

The adhesive is preferably a poly-acrylate emulsion with quick grab-contact characteristics, and of a composition compatible with the laminating resins commonly used to make a sandwich of which the core blanket is a component.

In travelling over the coating roll, the undersurface of scrim S is coated with a continuous adhesive coating so that ultimately each block is contacted with adhesive, adhering to every fiber in the scrim.

The coated scrim web, as shown in FIGS. 3 and 4, is then conducted through an inclined oven 33, which contains suitable heaters, such as infra-red lamps, serving to partially dry the adhesive and render it tacky, by heating only from the rear, in readiness for the subsequent combining operation, which takes place at the combining station generally designated by numeral 34.

Combining is effected by means of a conveyor belt 35 which receives the train of panels from conveyor belt 16 at the loading station and feeds the panels to a squeeze roller 36 to which is also fed tacky scrim web emerging from oven 33. A spacer device 37 installed on belt 35 near the loading station, locates each panel with a predetermined spacing (i.e., one-fourth inch) on belt 35 by means of a series of pressure rollers $P_1$, $P_2$, $P_3$ and $P_4$ serving to hold the panel to the belt until each panel is covered with the tacky scrim under squeeze roller 36.

Squeeze roller 36 is preferably Teflon-coated and is supported in adjustable air-operated bearing supports to provide up and down movement. The squeeze roller when in the down position against the scrim, acts to ensure even pressure on the panel despite any irregularities that may exist in the belt, the wood or in the scrim. This squeeze roller is free to rotate at the same surface speed as conveyor belt 35. A vacuum brush 38 (See FIG. 7) is provided near the input end of belt 35 to remove all residual dust from the panels to insure a clean combining surface. Then the squeeze roller 36 presses the tacky surface of the scrim against the face of the panels to effect bonding thereto.

The scrim web combined with the train of panels then enters a scrim-slitter station 39 which, as shown in FIG. 8, is provided with a transverse scalloped blade 40 mounted on a bridge 41 on swing arms 42 so that upon receipt of a signal from an electric eye PC, a quick-acting air cylinder causes the blade to move in an arcuate manner, in over and out of the scrim portion that bridges the adjacent panels. The scrim-slitting station functions to cut the scrim between adjacent panels in the train thereof, so that emerging from this station are scrim-faced panels $B_s$.

The scrim-faced panels $B_s$ are transferred to a turn-over device 44 which, as shown in FIG. 4, is composed of a bank of pivotally mounted arms, adapted to receive a scrim-faced panel and to then swing to transfer the panel to conveyor 45 of a first slitting station, generally designed by numeral 46. Thus the panels entering this station have their scrims on the base, and are therefore referred to as "scrim-based" panels $B_b$.

In the first slitting station 46, a row of equi-spaced slitting discs 47 mounted on a common axle serves to section the scrim-based panels into parallel strips, as shown in FIG. 9. From the first slitting station 46, the scrim based panels $B_b$ which moves in the direction of their length, are transferred by a right-angle transfer device 48 onto the conveyor 49 of a second slitting station 50 in which the panels are advanced in the direction of their width. At this station, the panel strips are transversely cut into blocks by a row of equi-spaced slitting discs 51.

The slitting discs at both slitting stations, as shown in FIG. 10, are set so that the slitting action falls slightly short of the base scrim S to leave a superficial skin $B_s$ of panel material, which, as pointed out previously, holds the blocks in close proximity to each other to prevent gapping. The depth of this skin is exaggerated in FIG. 10.

Thus the output of the second slitting station is a contour-core blanket in which the scrim-based panel is sectioned into blocks. After being discharged from the second slitting station, the blankets are individually packaged in hermetically sealed plastic envelopes. The purpose of such packing will now be explained.

Balsa is a highly porous wood and tends to absorb moisture. Since the balsa panels are kiln-dried, if they are stored in a relatively dry atmosphere before being converted into a contour-core blanket, and then shipped to a relatively humid area, the balsa blocks in the core blankets will absorb moisture and proceed to warp, making their subsequent use difficult. But if the panels, before being fabricated, are stored in a controlled atmosphere whose moisture content is similar to that in the atmosphere of the ultimate user, then it becomes possible to avoid a radical change in atmospheric conditions.

Hence, in practice, the panels, before fabrication into blankets, are stored in an atmosphere whose humidity is controlled so that the moisture content of the balsa reaches a predetermined level. After fabrication, the blankets are hermetically sealed to preserve the moisture content of the balsa, the seal being broken only at the place of use.

While there has been shown and described a preferred embodiment of a machine for making contour-core blankets, in accordance with the invention, it will be appreciated that many changes and modifications may be made therein without, however, departing from the essential spirit of the invention.

I claim:

1. A machine for making a tessellated contour-core blanket that is conformable to a contoured surface for lamination thereto by a bonding agent,
   a. a coating station,
   b. means supplying a web of scrim material to said coating station to apply a coating of adhesive to the underside of the web, said scrim having an open-mesh rendering it permeable to said bonding agent, said coating station including a spreader roll to remove wrinkles from the scrim web entering said station, and a printing roll engaging the undersurface of said web to apply an adhesive solution thereto in a predetermined pattern,
   c. a combining station,
   d. means to feed a train of balsa panels to said combining station and means including an oven to concurrently pass the coated web through said oven before it enters said combining station to render the adhesive layer tacky, and to then feed the coated web into said combining station to press and bond said coated web to the face of said panels,
   e. a scrim-cutting station to cut said scrim web transversely between successive panels in said train to produce a train of scrim-faced panels,
   f. a turnover device operatively coupled to the output of said scrim-cutting station reversing the position of said scrim-faced panels to produce a train of scrim based panels,
   g. a first slitting machine for receiving the train of scrim-based panels from said turnover device and for slitting same longitudinally to section the panels into parallel strips, and
   h. a second slitting station for receiving the train of longitudinally slit, scrim-based panels from the first slitting station and for slitting same transversely to produce blocks, the slitters at said first and second stations being set to fall short of said scrim and to leave a superficial skin holding the blocks together to prevent gaps therebetween and to prevent said bonding agent from seeping into the spaces between said blocks.

2. A machine as set forth in claim 1, wherein said means to supply a web of scrim material to said coating station is constituted by a scrim supply station provided with a roll of scrim material supported for rotation on an axle which is tensioned to prevent overfeed of said roll.

3. A machine as set forth in claim 1, wherein said scrim-cutting station is constituted by a knife mounted for reciprocal travel on a bridge supported across the entering web on a carriage which moves in the direction of the web and at the same speed in the course of a cutting action.

4. A machine as set forth in claim 1, wherein said means to feed a train of balsa to said combining station is constituted by a loading station provided with an inclined slide, means to feed panels, on edge, down said slide, and means at the foot of said slide to eject said panels laterally one-by-one onto a conveyor table leading to said combining station.

5. A machine as set forth in claim 4, wherein said means to eject said panels includes a pusher actuated by a hydraulic cylinder, said pusher engaging the end of the panel at the foot of the slide and pushing the panel laterally out of the slide.

6. A machine as set forth in claim 5, further including means at the foot of the slide to sense the ejected panel and to produce a signal controlling said hydraulic cylinder to retract the pusher upon completion of ejection.

7. A machine as set forth in claim 1, wherein said slitting stations are each provided with an array of equi-spaced slitting wheels mounted in a common axle whose height relative to the panel is adjustable.

* * * * *

UNITED STATES PATENT OFFICE
CERTIFICATE OF CORRECTION

PATENT NO. : 3,909,342
DATED : September 30, 1975
INVENTOR(S) : Gerald D. Shook

It is certified that error appears in the above-identified patent and that said Letters Patent are hereby corrected as shown below:

Column 1, line 64 "blankets" should have read -- bridges --

Signed and Sealed this ninth Day of December 1975

[SEAL]

Attest:

RUTH C. MASON
Attesting Officer

C. MARSHALL DANN
Commissioner of Patents and Trademarks